United States Patent [19]

van der Lely et al.

[11] 4,058,068

[45] Nov. 15, 1977

[54] SOIL CULTIVATING AND SOWING IMPLEMENT

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 643,839

[22] Filed: Dec. 23, 1975

[30] Foreign Application Priority Data

Dec. 30, 1974 Netherlands .......................... 7416983

[51] Int. Cl.² ............................................ A01B 33/00
[52] U.S. Cl. ........................................ 111/36; 172/59; 172/68; 172/395; 111/55; 172/438; 111/65; 172/421
[58] Field of Search ............... 172/59, 68, 105, 395, 172/77, 111, 112, 438; 111/36, 52, 63, 55, 65

[56] References Cited

U.S. PATENT DOCUMENTS

| | | | |
|---|---|---|---|
| 3,616,862 | 11/1971 | van der Lely | 172/59 |
| 3,826,314 | 7/1974 | van der Lely et al. | 172/59 |
| 3,899,029 | 8/1975 | van der Lely et al. | 172/59 X |
| 3,951,213 | 4/1976 | van der Lely | 172/59 |

Primary Examiner—George J. Marlo
Attorney, Agent, or Firm—Mason, Mason & Albright

[57] ABSTRACT

A cultivator or rotary harrow has soil working members rotatable about upwardly extending shafts journalled in a frame portion that extends transverse to the direction of travel. The front of the frame is supported by a coupling attached to a prime mover and the rear of the implement is supported by two ground wheels. One wheel is located at each lateral side of the frame portion at the rear thereof and a bracket is pivoted to the frame with rearwardly extending arms connected to the wheel axle mountings. An extensible connecting member interconnects the axle mountings to the frame above the bracket so that the wheels can be vertically displaced by shortening or lengthening the connecting members. A sowing mechanism, including a feed box, is mounted to the rear of the soil working members with delivery tubes leading to shoes. A flow control mechanism is driven by a transmission from the wheel mountings and the shoes can be raised or lowered by a linkage and control lever.

30 Claims, 4 Drawing Figures

SOIL CULTIVATING AND SOWING IMPLEMENT

Figure 1:
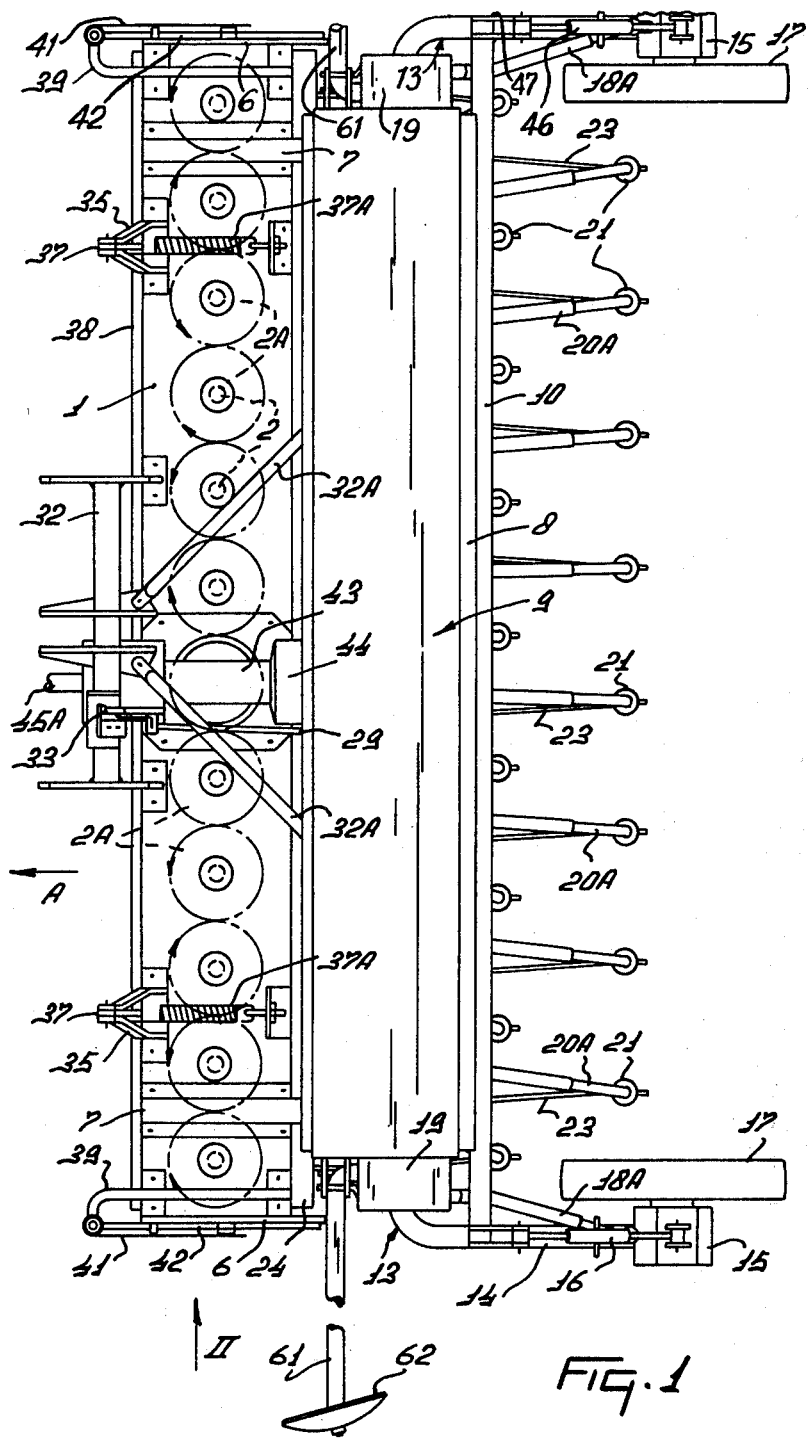
Figure 2:
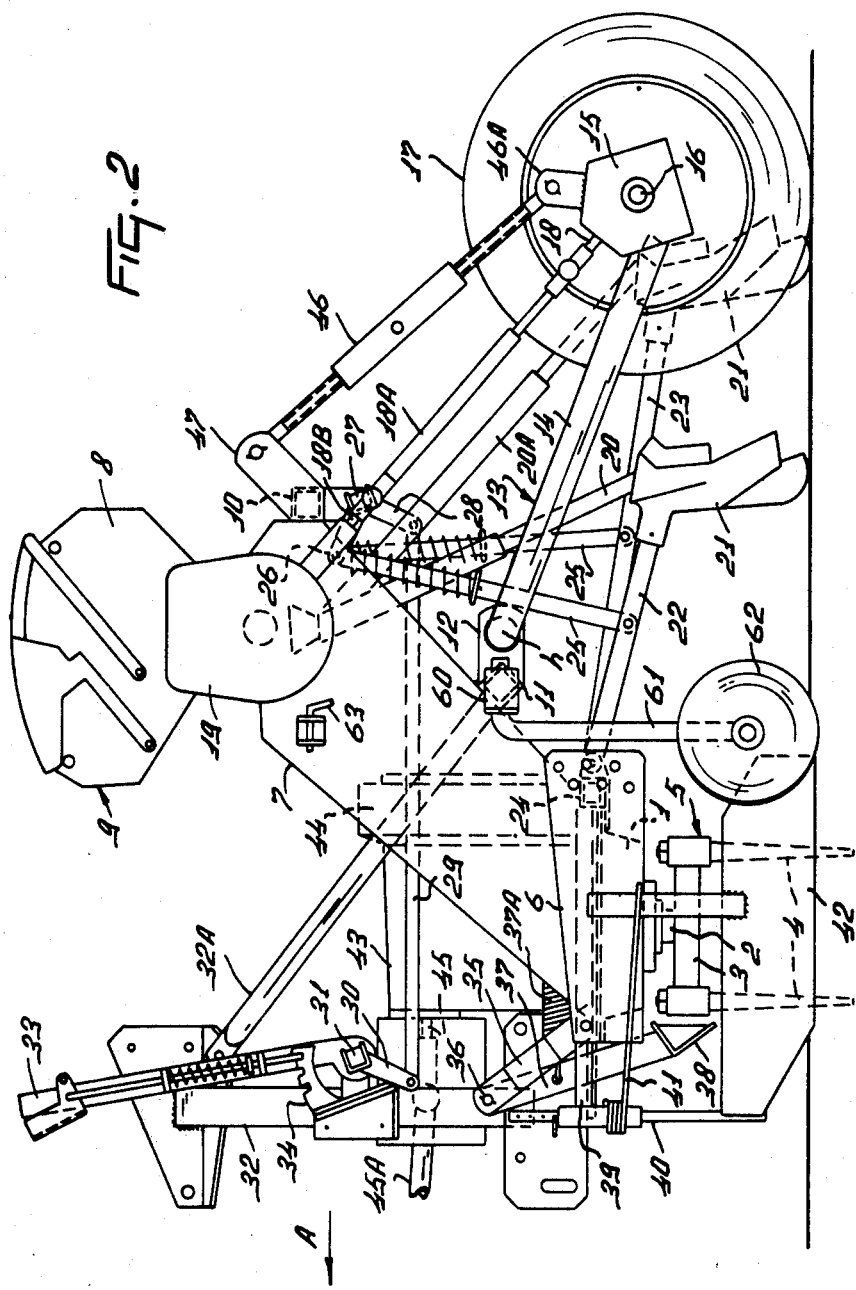
Figure 3:
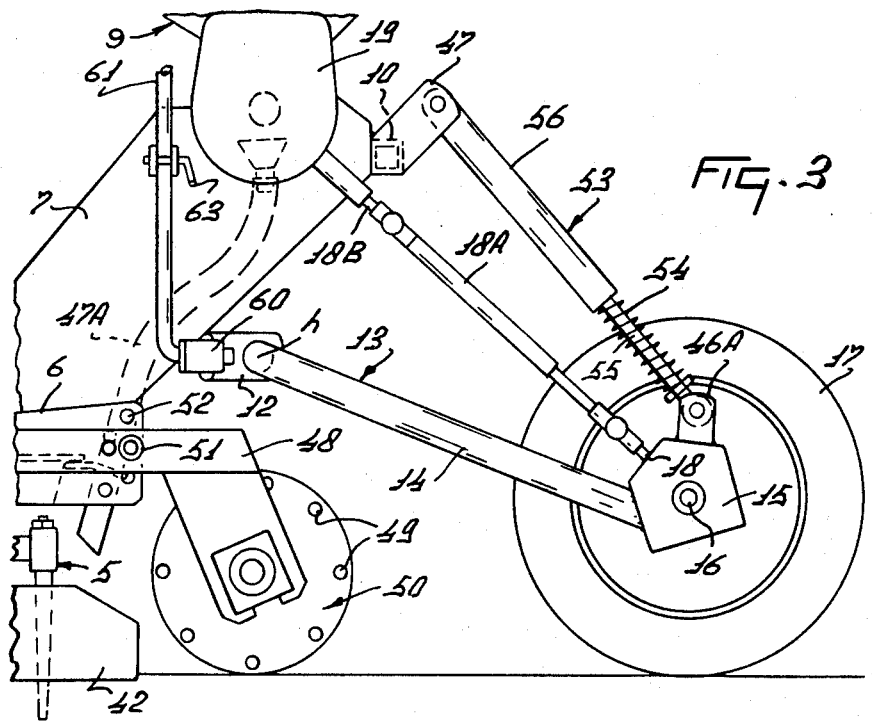
Figure 4:
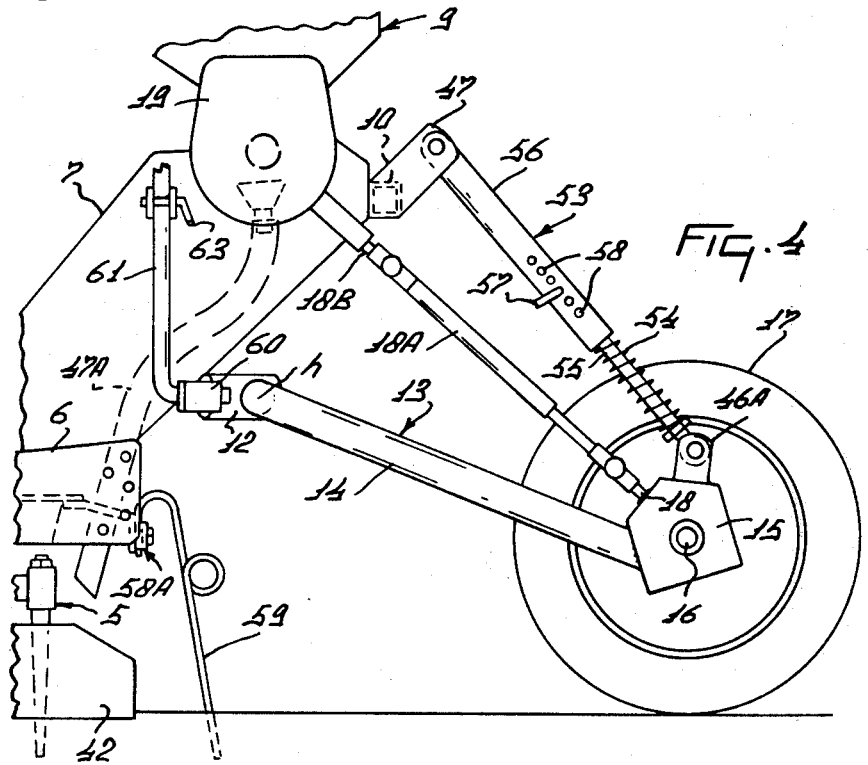

For a better understanding of the invention, and to show how the same may be carried into effect, reference will now be made, by way of example, to the accompanying drawings, in which:

FIG. 1 is a plan view of a soil cultivating implement in accordance with the invention, FIG. 2 is a side elevation of the implement of FIG. 1, to an enlarged scale, as seen in the direction indicated by an arrow II in FIG. 1, FIG. 3 generally corresponds to the right-hand side of FIG. 2 but illustrates an alternative arrangement, and FIG. 4 also generally corresponds to the right-hand side of FIG. 2 but shows a further alternative arrangement.

Referring to FIGS. 1 and 2 of the drawings, the implement has a frame which comprises a hollow box-shaped frame portion 1 that extends substantially horizontally transverse, and normally substantially horizontally perpendicular, to the intended direction of operative travel of the implement that is indicated in FIGS. 1 and 2 of the drawings by an arrow A. The frame portion 1 supports, at regularly spaced apart intervals, a plurality of upright, and normally vertically or substantially vertically disposed, rotary shafts 2. In the embodiment which is being described, there are twelve of the rotary shafts 2 arranged in a single row with their axes of rotation spaced apart from one another at intervals which it is preferred should be substantially 25 centimeters. The lower end of each shaft 2 projects from beneath the bottom of the hollow frame portion 1 and there has the centre of a substantially horizontally disposed tine support 3 secured to it. Substantially vertically disposed sleeve-like tine holders are secured to the opposite ends of each tine support 3 and firmly, but releasably, receive the fastening portions of rigid soil working tines 4 that project downwardly from said holders to penetrate into the ground surface during the operation of the implement. Each tine support 3 and the corresponding tines 4 together afford a soil working member or cultivating member 5. The strips of land that are worked by the individual members 5, during the use of the implement, have widths whose magnitudes are a little greater than the distances between the axes of rotation of immediately neighbouring shafts 2 so that the twelve members 5 cooperate to produce a single broad strip of worked soil having a width, in this embodiment, of marginally in excess of 3 meters.

The opposite ends of the frame portion 1 are provided with substantially vertically disposed plates 6 that both extend substantially parallel to the direction A and which have rear edges of greater vertical extent than their front edges because the upper edges thereof are upwardly inclined from front to rear (see FIG. 2). The frame portion 1 also carries, at short distances inwardly towards the centre thereof from the plates 6, upwardly and rearwardly inclined support plates 7 that have bent-over rims and whose tops rigidly carry a seed box or hopper 8 of a sowing mechanism in the form of a seed drill that is generally indicated by the reference 9. It will be seen from the drawings that the seed box or hopper 8 extends parallel or substantially parallel to the transverse length of the frame portion 1 and thus normally perpendicular or substantially perpendicular to the direction A. A hollow beam 10 of substantially square cross-section rigidly interconnects upper rear regions of the support plates 7 at a level below that of the seed box or hopper 8, said beam 10 being in substantially parallel relationship with both the frame portion 1 and the seed box or hopper 8. The rear oblique edges of the support plates 7 are also interconnected by a tie beam 11 that is parallel or substantially parallel to the beam 10 and located at a level a little below that of the centers of the support plates 7. The tie beam 11 is of the same formation as the beam 10 and is provided with rearwardly projecting apertured lugs 12 which turnably receive the web or base of a large tubular bracket 13 that is of broad and shallow channel-shaped configuration. As will be seen from the drawings, the web or base of the bracket 13 extends substantially parallel to the beams 10 and 11, immediately to the rear of the latter beam 11, its two limbs constituting arms 14 that are inclined downwardly and rearwardly from the web or base at substantially the opposite sides of the implement.

The lowermost and rearmost end of each bracket arm 14 carries a corresponding gear box 15 and each gear box 15 rotatably supports a corresponding stub shaft 16 that is substantially horizontally parallel to the beams 10 and 11. The ends of the two stub shafts 16 that face inwardly towards one another carry corresponding tired ground wheels 17 that are located substantially immediately alongside their respective gear boxes 15. Each stub shaft 16 is provided, inside the corresponding gear box 15, with a bevel pinion whose teeth are in mesh with those of a further bevel pinion carried by a corresponding shaft 18 which is arranged to extend obliquely upwardly and forwardly with respect to the direction A. Each shaft 18 projects from the corresponding gear box 15 and is coupled by a telescopic transmission shaft 18A, having universal joints at its opposite ends, to an input shaft 18B of a corresponding gear box 19. It will be evident from the drawings that the gear boxes 19 are located at the opposite ends of the seed box or hopper 8 and that their respective input shafts 18B project downwardly and rearwardly with respect to the direction A towards the corresponding output shafts 18 of the gear boxes 15. The two gear boxes 19 are secured to the corresponding support plates 7 and each of them is internally provided with bevel pinions that couple the corresponding input shafts 18B to the opposite ends of a rotary flow control member of the seed drill 9 that comprises a shaft which extends substantially parallel to the beams 10 and 11 inside the seed box or hopper 8 close to the bottom thereof. The rotary flow control member, which is not illustrated in detail in the drawings, comprises a plurality of feeding elements which supply seeds from the box or hopper 8 to corresponding delivery tubes 20 and 20A. The delivery tubes 20 and 20A are of telescopic formation and the lowermost and rearmost end of each of them supplies a corresponding sowing shoe 21. The sowing shoes 21 may be interchangeable, in dependence upon the seeds that are to be sown, and each of them may, for example, comprise a furrow opener, a coulter and a furrow closer. Successive feeding elements co-operate alternately with the tubes 20 and 20A which latter are of different lengths, the tubes 20 co-operating with a leading row of the sowing shoes 21 and the tubes 20A co-operating with a rearward row of the sowing shoes 21. As can be seen in FIG. 1 of the drawings, the sowing shoes 21 of the leading row will, during the operation of the implement, sow seeds in rows that lie midway between the rows that are sown with seed by the rearward shoes 21.

Each sowing shoe 21 of the leading row is fastened to a corresponding arm 22 and each sowing shoe 21 of the rearward row is fastened to a corresponding longer arm 23. The shoes 21 are fastened to the rearmost ends of the arms 22 and 23 and the leading ends of those arms, with respect to the direction A, are pivotally connected to lugs carried by a supporting beam 24 that is mounted at the rear of the frame portion 1 so as to extend parallel to the transverse length of that frame portion. The supporting beam 24 extends between the two plates 6 at the opposite ends of the frame portion 1 and is mounted in a manner which enables it to be readily detached from the frame of the implement. Thus, each of the arms 22 and longer arms 23 is turnable upwardly and downwardly about a substantially horizontal axis in a manner which is known per se, upward displacements being effected against the opposition of corresponding helical compression springs which can be seen in FIG. 2 of the drawings and which are arranged around upper regions of telescopic rods 25. The lower ends of the telescopic rods 25 are pivotally connected to the corresponding arms 22 and longer arms 23 whereas the upper ends thereof are turnable about substantially horizontal pivots 26 relative to short arms carried by a support 27 that extends substantially parallel to the beams 10 and 11 and which is turnable about its own longitudinal axis relative to lugs which depend from the beam 10. A central region of the support 27 carries a downwardly and forwardly inclined arm 28 whose leading lower end is pivotally coupled to the rear end of a forwardly extending connecting rod 29. The opposite leading end of the connecting rod 29 is pivotally coupled to the lower end of a short arm 30 carried by a shaft 31 which is substantially parallel to the beams 10 and 11 and which is turnable about its own longitudinal axis relative to a generally triangular coupling member or trestle 32. The coupling member or trestle 32 is mounted in front of the frame portion 1, centrally across the width of the implement, and is constructed and arranged for connection to the three-point lifting device or hitch at the rear of an agricultural tractor or other vehicle which moves and operates the implement during the use thereof. Strengthening tie beams 32A extend in downwardly and rearwardly convergent relationship from substantially the top of the coupling member or trestle 32 to horizontally spaced apart locations along the length of the tie beam 11. The shaft 31 carries an adjusting lever 33 by which said shaft can be turned about its own longitudinal axis, the lever 33 being provided with a spring-loaded retaining member that co-operates with a toothed quadrant 34 in the same general manner as a motor vehicle hand brake or parking brake lever. Thus, the adjusting lever 33 can be employed to set the shaft 31 in any chosen one of a number of different angular positions about its own longitudinal axis, the toothed quadrant 34 acting to retain any chosen setting until a change thereof is required. The adjusting lever 33 is employed to raise or lower the sowing shoes 21 and to retain them at chosen operative levels. As illustrated in FIG. 2 of the drawings, the lever 33 can occupy a setting in which said shoes 21 are raised to an inoperative position. The adjusting lever 33 occupies a position in which it is accessible to the driver of an agricultural tractor to which the coupling member or trestle 32 of the implement may be connected in the use of the implement.

Supports 35 project upwardly and forwardly with respect to the direction A from the top of the frame portion 1 at locations which are at substantially the front of that frame portion and which are towards, but not at, the opposite ends thereof. Strong horizontal pivot pins 36 at the upper ends of the supports 35 connect the upper ends of downwardly and rearwardly inclined arms 37 to said supports at locations between symmetrically opposed limbs of those supports (see FIG. 1). The lower ends of the two arms 37 are rigidly secured to a screening beam 38 that extends substantially horizontally parallel to the beams 10 and 11 just in front of the tine supports 3, the tine holders and the upper fastening portions of the tines 4. The screening beam 38 acts to deflect stones and other obstacles that may be met with during the operation of the implement away from the parts of the soil working members or cultivating members 5 that have just been mentioned thus reducing the occurrence of damage to those parts from collisions with such obstacles to a very low frequency in relation to the duration of operation of the implement. The arms 37 are normally maintained in abutting relationship with stops at the front of the frame portion 1 by two helical tension springs 37A that are stretched between eyes formed in the arms 37 and anchorages located at the top and rear of the frame portion 1. The anchorages are provided with tension adjusters and the arrangement is such that, should a loose stone or other obstacle become momentarily trapped between at least one of the members 5 and the rear of the screening beam 38, the latter can yield forwardly, about the axis defined by the pivot pins 36 and against the opposition of the springs 37A, to allow said stone or other obstacle to be released. Arms 39 that extend substantially parallel to the direction A are mounted on top of the frame portion 1 very close to the opposite ends of that frame portion, the leading ends of said arms 39 being bent over through substantially 90° in opposite directions away from the center of the implement. The free end of each bent-over portion of each arm 39 carries a corresponding substantially vertically disposed sleeve in which a substantially vertical shaft 40 is both turnable and upwardly and downwardly displaceable in an adjustable manner. The lowermost end of each shaft 40 rigidly carries the front of a corresponding shield plate 42 that lies just beyond the corresponding end of the single row of soil working members or cultivating members 5. Each shield plate 42 carries an upwardly projecting abutment which is normally urged into contact with the corresponding plate 6 by a rearwardly projecting limb of a coil spring 41 that is wound around, and anchored to, the corresponding sleeve. The shield plates 42 co-operate with the soil working members or cultivating members 5 at the opposite ends of the row thereof and, in the event of a loose stone or other obstacle becoming momentarily trapped between either such end member 5 and the corresponding shield plate 42, that shield plate can turn outwardly, about the longitudinal axis of the corresponding shaft 40 and against the action of the corresponding coil spring 41, to allow the release of the stone or other obstacle.

One of the center pair of shafts 2 of the single row thereof has an upward extension through the top of the frame portion 1 into a gear box 43 that is mounted on top of that frame portion. Bevel pinions and/or other transmission members within the gear box 43 place the shaft extension in driven connection with a forwardly projecting splined or otherwise keyed rotary input shaft 45 of the gear box. The transmission members include a change-speed gear 44 that is mounted at the rear of the gear box 45 and which enables the transmission ratio between the shaft 45 and a further parallel shaft which is not visible in the drawings to be changed. It is not necessary to describe the construction or operation of the change-speed gear 44 in any detail and it suffices to note that its use enables the speed of rotation of the soil working members or cultivating members 5 to be increased or decreased, as may be required, without having to alter the input speed of rotation that is applied to the shaft 45 of the gear box 43. As illustrated in FIG. 2 of the drawings, the leading splined or otherwise keyed end of the rotary input shaft 5 is arranged to be placed in driven connection with the power take-off shaft at the rear of the agricultural tractor or other vehicle which moves the implement, during the use thereof, by way of a telescopic transmission shaft 45A, which is of a construction that is known per se, having universal joints at its opposite ends. Each of the shafts 2 is provided, inside the hollow frame portion 1, with a corresponding straight-toothed or spur-toothed pinion 2A, the arrangement of the row of twelve pinions 2A being such that the teeth of each pinion in that row are in mesh with those of its immediately neighbouring pinion or both of its immediately neighbouring pinions. The tops of both of the gear boxes 15 are provided with upright pairs of lugs 46A and one end of a rod 46 that is of adjustable length is pivotally connected to each pair of lugs 46A, the opposite ends of the two adjustable rods 46 being pivotally connected to further pairs of lugs 47 that project upwardly and rearwardly from the beam 10 at the opposite ends of that beam. It should be noted that the rods 46, that are adjustable in length in a manner that is known per se and that will be evident from a study of FIG. 2 of the drawings, are formed from a material that exhibits a strong resistance to bending. As seen in side elevation (FIG. 2), the support plates 7, the upwardly and downwardly turnable arms 14 and the rods 46 lie at the three sides of a substantially triangular Figure.

When the implement that has been described is to be used with the seed drill 9 rigidly mounted thereon, its coupling member or trestle 32 is connected to the three-point lifting device or hitch at the rear of an agricultural tractor or other operating vehicle and the rotary input shaft 45 of the gear box 43 is placed in driven connection with the power take-off shaft of the same tractor or other vehicle employing the telescopic transmission shaft 45A. Upon rotating the shaft 45, the shafts 2 and the soil working members or cultivating members 5 which they carry will be caused to rotate in the directions that are indicated by arrows in FIG. 1 of the drawings, those directions being such that each member 5 revolves in the opposite direction to its immediate neighbour or to both of its immediate neighbours. As the implement is moved over the land in the direction A, the tines 4 of the members 5 penetrate into the soil and work overlapping strips thereof to produce, in effect, a single broad strip of worked ground. Seeds can be deposited in the worked ground by the sowing shoes 21 which, as previously described, are in connection with the seed box or hopper 8 by way of the delivery tubes 20 and 20A. Rotation of the two ground wheels 17 drives the rotary flow control member of the seed drill 9 from both its opposite ends and it will be evident that the speed at which said flow control member rotates is directly proportional to the speed of revolution of the ground wheels 17 so that the seeds will be supplied to the shoes 21 at a faster rate when the implement is moving at a relatively high speed in the direction A and vice versa. The depth of penetration of the tines 4 of the members 5 into the soil can be increased or decreased as may be desired by decreasing, or increasing, the effective lengths of the two rods 46. The speed of rotation of the members 5 in response to a substantially constant input speed of rotation applied to the shaft 45 will be dependent upon the chosen transmission ratio previously established in the change-speed gear 44. When the lengths of the rods 46 are increased, the arms 14 of the tubular bracket 13 are turned downwardly about the longitudinal axis $h$ (FIG. 2) of the web or base of the bracket 13 together with the ground wheels 17 which they support. The tines 4 consequently do not penetrate so deeply into the ground as they did prior to the adjustment of the length of the rods 46. Upon shortening the rods 46, the arms 14 are turned upwardly about the axis $h$ and the tines 4 can penetrate more deeply into the soil. It will be noted that the axis $h$ is located substantially exactly vertically beneath the seed box or hopper 8 and that said seed box or hopper is itself disposed between the frame portion 1 and the ground wheels 17 when the implement is viewed in plan (FIG. 1). The axis $h$ is disposed at a height above the ground surface which is approximately, but not necessarily exactly, half the height of the bottom of the seed box or hopper 8 above the ground surface. When the implement is in operation, a major part of its total weight is supported from the ground surface by the wheels 17. The distance between the front of each ground wheel 17 and the rear of the frame portion 1 is approximately three times the fore and aft width (in the direction A) of the frame portion 1 itself.

The implement can be used with the supporting beam 24 disconnected from the frame portion 1 together with the telescopic rods 25, the delivery tubes 20 and 20A and the sowing shoes 21, the parts 20, 20A and 21 being replaced by hoses 47A (FIG. 3) that communicate directly with the outlet openings that are formed in the bottom of the seed box or hopper 8 for co-operation with the rotary flow control member of the seed drill 9. As can be seen in FIG. 3 of the drawings, the lowermost delivery ends of the hoses 47A open out immediately to the rear of the frame portion 1 and the soil working members or cultivating members 5. Under these circumstances, arms 48 have their leading ends pivotally connected to the tops and fronts of the plates 6 so that said arms 48 are turnable upwardly and downwardly alongside those plates. The rearmost ends of the arms 48 carry downwardly directed brackets and a rotary supporting member in the form of a wide ground roller 50 is rotatably mounted between said brackets with the aid of substantially horizontally aligned bearings. The roller 50 is of open cylindrical formation and its periphery comprises a plurality, such as eight, of regularly spaced apart tubular or rod-formation elongate members 49, said members 49 extending parallel to the axis of rotation of the roller 50 or being wound helically around that axis to some extent. In addition to performing its supporting function, the roller 50 works the soil to some extent particularly by crushing or crumbling any unbroken lumps of soil turned up by the foregoing tines 4 with a general levelling effect upon the soil surface. The level of the axis of rotation of the roller 50 is adjustable relative to the level of the frame portion 1 by turning the arms 48 upwardly or downwardly alongside the plates 6 and entering corresponding retaining bolts 51 through holes in the arms 48 and through chosen ones of holes 52 that are formed near the rearmost edges of the plates 6. The level of the axis of rotation of the roller 50 that is chosen relative to the level of the frame portion 1 is a principal factor in determing the depth of penetration of the tines 4 of the members 5 into the ground during the use of the implement. It will be noted that, when the implement is arranged as illustrated in FIG. 3 of the drawings, seeds are delivered from the hoses 47A between the members 5 and the roller 50 so that said seeds tend to be spread to some extent rather than sown in rows as is the case when the implement is disposed as shown in FIGS. 1 and 2 of the drawings.

When the arrangement illustrated in FIG. 3 of the drawings is employed, the rods 46 are replaced by alternative connecting members 53 that are also constructed so as to be highly resistant to bending. Each connecting member 53 is of spring-loaded telescopic construction and comprises an inner portion 55 that is slidable in an outer cylindrical portion 56, a helical compression spring that surrounds the inner portion 55 being arranged to bear between an internal surface of the portion 56 and a stop carried by the portion 55 at a location very close to the pivotally connected lowermost end of the latter. The springs 54 thus tend to cause the connecting members 53 to extend to their maximum possible lengths but said springs 54 remain more or less compressed during the operation of the implement providing a resilient suspension which tends to maintain the tires of the ground wheels 17 in sufficiently firm engagement with the ground surface to ensure that the rotary flow control member of the seed drill 9 will be driven effectively.

Instead of using the supporting roller 50, the hoses 47A can be employed with an additional non-rotary tine harrow that is generally indicated by the reference 58A (FIG. 4) and that comprises a transverse (with respect to the direction A) row of resilient tines 59 formed, for example, from spring steel rod. Although not illustrated, there could, if desired, be more than one row of the tines 59. In the absence of the roller 50, the working depth of the members 5 is again controlled by the position of the ground wheels 17. The connecting members 53 of FIG. 3 of the drawings may be replaced by the rods 46 of FIGS. 1 and 2 of the drawings, which rods also afford connecting members, or the modified connecting members 53 that are illustrated in FIG. 4 itself may be used. The modification comprises forming the inner portion 55 with at least one transverse hole and the cylindrical wall of the outer portion 56 with opposed rows of aligned holes 58. A transverse locking pin 57 is also provided and the effective length of each connecting member 53 is set, as may be required, by entering the locking pin 57 through a chosen pair of the holes 58 and through the intervening hole, or one of the intervening holes, in the inner portion 55. The effect of the spring 54 of each connecting member 53 is thus suppressed.

The implement that has been described is an effective combination of a soil cultivating implement with a seed drill, the ground wheels 17 being capable of serving not only to control the depth of penetration of the tines 4 of the members 5 into the ground but also to drive the rotary flow control member of the seed drill 9. If the roller 50 that affords a rotary supporting member is provided behind the members 5 as illustrated in FIG. 3 of the drawings so that seeds supplied via the hoses 47A are mixed with the freshly worked soil and spread to some extent, the connecting members 53 may be used so that the ground wheels 17 are urged resiliently downwards towards the ground surface but are displaceable upwardly against the opposition of the resilient means that is provided. The springs 54 that afford this resilient means are of sufficient strength to ensure that the frictional contact between the tires of the wheels 17 and the ground surface will reliably rotate the wheels 17 during the operation of the implement so that the seed drill 9 will supply seeds at a substantially constant and substantially uniform rate.

As illustrated in the drawings, the opposite ends of the beam 12 are advantageously provided with substantially horizontal sleeves 60 whose axes are substantially parallel to the direction A, each sleeve 60 turnably receiving the perpendicularly bent-over end of a corresponding arm 61. The arms 61 are turnable upwardly and downwardly at the sides of the implement about the axes of the sleeves 60 and are provided, at substantially their free ends, with corresponding marker discs 62. Brackets that are provided with locking pins 63 are mounted on the support plates 7 and can be employed to retain the arms 61 and their marker discs 62 in upwardly tilted inoperative positions in which said marker discs 62 are well clear of contact with the ground surface. FIGS. 3 and 4 of the drawings each show one arm 61 retained in its inoperative position by the corresponding locking pin 63. It is noted that, while it is preferred to employ two supporting ground wheels 17 at the rear of the implement in driving connection with the rotary flow control member of the seed drill 9, this is not essential. If desired, a single supporting ground wheel, equivalent to one of the wheels 17, can be used to drive the rotary flow control member and will do so entirely satisfactorily under all but the most extreme of adverse conditions.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the implement that has been described, and/or that is illustrated in the accompanying drawings, both individually and in various combinations.

What we claim is:

1. A rotary harrow comprising a frame and a plurality of soil working members mounted on a portion of said frame, said soil working members being mounted on corresponding shafts and rotatable about upwardly extending axes defined by said shafts, driving means connected to rotate said soil working members, a coupling member on said frame being positioned for connection to a prime mover, at least one supporting ground wheel being pivotably connected to the implement by arm means adjacent the rear of said frame portion and at a level higher than said frame portion, adjusting means interconnecting said wheel with said frame portion, said wheel being vertically displaceable by said adjusting means and turnable about the pivot connection of said arm means to the implement, whereby the relative position of the wheel's rotary axis with respect to said frame portion can be changed, said adjusting mechanism having fixing means that secures said wheel and arm means in a fixed, non-pivotable position with respect to said frame portion.

2. An implement as claimed in claim 1, wherein said supporting wheel is displaceable against resilient opposition about a pivot axis that extends transverse to the direction of travel of the implement and said pivot axis is located adjacent said frame portion, a sowing mechanism being positioned on the frame to the rear of said soil working means.

3. An implement as claimed in claim 2, wherein said pivot axis extends substantially horizontal and is located at a higher level than said frame portion.

4. An implement as claimed in claim 2, wherein a sowing mechanism comprising a seed box extends substantially horizontally transverse to the direction of travel, said box being located, when the implement is viewed in plan, between said frame portion and said supporting wheel.

5. An implement as claimed in claim 4, wherein the seed box is located substantially vertically above said pivot axis.

6. An implement as claimed in claim 5, wherein said pivot axis is located at a height above the ground surface which is substantially half the height of the bottom of said seed box above the same surface.

7. An implement as claimed in claim 5, wherein said seed box incorporates a rotary flow control member and that member is driven from said supporting wheel during travel by a transmission, said transmission including a gear box in which an axle shaft of said wheel is journalled and a telescopic transmission shaft to a further gear box at one end of said seed box.

8. An implement as claimed in claim 2, wherein said adjusting means comprises a connecting member that extends between a mounting of said supporting wheel and said frame, said connecting member forming a strut connection between said wheel and frame portion.

9. An implement as claimed in claim 8, wherein one end of said connecting member is pivotally connected to the frame adjacent the bottom of a seed box of the sowing mechanism and the opposite end is connected to the wheel mounting adjacent its axis of rotation.

10. An implement as claimed in claim 9, wherein said connecting member is an elongated telescoping rod assembly.

11. An implement as claimed in claim 10, wherein the length of said connecting member is variable against resilient opposition.

12. An implement as claimed in claim 11, wherein said connecting member comprises two portions that are telescopically displaceable relative to one another and a compression spring is positioned to bear between said portions.

13. An implement as claimed in claim 12, wherein said fixing means interconnects said portions in relatively fixed positions.

14. An implement as claimed in claim 9, wherein a transmission to a flow control member in the sowing mechanism is drivingly connected to said wheel and said connecting member extends substantially parallel to a telescopic transmission shaft of said transmission.

15. An implement as claimed in claim 14, wherein, with respect to the direction of travel, sowing shoes in communication with outlets of a seed box of the sowing mechanism are positioned between the rear of said frame portion and said supporting wheel, delivery tubes leading from said outlets to said shoes.

16. An implement as claimed in claim 15, wherein each sowing shoe is located adjacent the rear of the frame portion and is pivotally connected to said frame by an arm.

17. An implement as claimed in claim 16, wherein a supporting beam of the frame is located at the rear of said frame portion, and has the arms pivotally interconnect the shoes with said supporting beams.

18. An implement as claimed in claim 17, wherein setting means for determining the level of the sowing shoes is connected to said supporting beam, the setting means comprising an adjusting lever mounted at the front of said frame portion and said beam being turnable by said lever.

19. An implement as claimed in claim 2, wherein the bottom of a seed box of the sowing mechanism has outlets in connection with hoses and these hoses have delivery ends located adjacent the rear of said frame portion, a further soil working member being supported on said frame to the rear of said frame portion and said delivery ends.

20. An implement as claimed in claim 19, wherein said further member is an open ground roller pivotally connected to said frame, said roller being vertically displaceable relative to the frame portion and means retaining the level of the axis of rotation of said roller at any chosen one of a plurality of different levels with respect to the said portion.

21. An implement as claimed in claim 19, wherein said further member is an assembly of resiliently mounted tines located side-by-side.

22. An implement as claimed in claim 2, wherein there are two supporting wheels connected at the rear of the frame and the axes of rotation of these wheels are substantially coincident.

23. An implement as claimed in claim 22, wherein the distance between said two supporting wheels is not less than half the length of said frame portion in a direction transverse to the direction of travel.

24. An implement as claimed in claim 23, wherein the distance between said two supporting wheels is not less than the length of said frame portion in said direction.

25. An implement as claimed in claim 2, wherein the distance between the front of said supporting wheel and the rear of said frame portion in a direction parallel to the direction of travel, is not less than substantially three times the width of said frame portion in a direction transverse to said direction.

26. An implement as claimed in claim 2, wherein there are two supporting wheels and rotary mountings of said wheels are mounted on pivotal arms of a bracket, the base of said bracket defining a pivotal axis that is turnably connected to the frame.

27. An implement as claimed in claim 26, wherein the supporting wheels are located at opposite lateral sides of said frame portion and said arms extend forwardly from mountings on said wheels to said base above said frame portion.

28. A rotary harrow comprising a frame and a plurality of soil working members mounted on a portion of said frame, said soil working members being rotatable about upwardly extending axis afforded by shafts, driving means connected to said shafts to rotate said soil working members, a coupling member on the front of said frame being connectable to a prime mover, at least one supporting ground wheel on arm means and the latter being pivotably connected to the implement by at least one pivot located adjacent the rear of said frame portion, said pivot being positioned at a level higher than said frame portion, and said supporting wheel being displaceable against resilient opposition about said pivot during operation.

29. An implement as claimed in claim 28, wherein a driveable sowing machine is supported on said frame to the rear of said soil working members and means interconnects said supporting wheel to said machine to drive same during operation.

30. An implement as claimed in claim 29, wherein a corresponding supporting wheel is mounted on said arm means and positioned at each lateral end of said implement, to the rear of said frame portion, each wheel being in driving engagement with flow control means of said sowing machine.

* * * * *